(12) United States Patent
Chang et al.

(10) Patent No.: US 9,996,112 B2
(45) Date of Patent: Jun. 12, 2018

(54) ELECTRONIC ASSEMBLY AND DOCKING STATION

(71) Applicant: Acer Incorporated, New Taipei (TW)

(72) Inventors: Kai-Lin Chang, New Taipei (TW); Ming-Yen Wu, New Taipei (TW); Chien-Yu Lee, New Taipei (TW); Fang-Ying Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days. days.

(21) Appl. No.: 15/662,240

(22) Filed: Jul. 27, 2017

(65) Prior Publication Data
US 2018/0129248 A1 May 10, 2018

(30) Foreign Application Priority Data

Nov. 10, 2016 (TW) .................................. 105136569
Dec. 30, 2016 (TW) .................................. 105144052

(51) Int. Cl.
*G06F 1/16* (2006.01)

(52) U.S. Cl.
CPC .......... *G06F 1/1632* (2013.01); *G06F 1/1662* (2013.01); *G06F 1/1681* (2013.01)

(58) Field of Classification Search
CPC .... G06F 1/1632; G06F 1/1662; G06F 1/1681; G06F 1/1626
See application file for complete search history.

(56) References Cited

U.S. PATENT DOCUMENTS

| | | | |
|---|---|---|---|
| 6,700,775 B1* | 3/2004 | Chuang | G06F 1/1626 361/679.01 |
| 6,986,492 B2* | 1/2006 | Huang | G06F 1/1632 248/346.03 |
| 7,916,468 B2* | 3/2011 | Takizawa | F16M 11/105 361/679.41 |
| 8,253,518 B2* | 8/2012 | Lauder | G06F 1/1647 206/320 |
| 8,665,589 B2* | 3/2014 | Lin | G06F 3/0202 361/679.41 |

(Continued)

FOREIGN PATENT DOCUMENTS

| | | |
|---|---|---|
| CN | 203276121 | 11/2013 |
| TW | 201322766 | 6/2013 |

(Continued)

*Primary Examiner* — Hoa C Nguyen
*Assistant Examiner* — Sagar Shrestha
(74) *Attorney, Agent, or Firm* — JCIPRNET

(57) ABSTRACT

An electronic assembly including a portable electronic device and a docking station is provided. The portable electronic device has a first surface and a second surface opposite to each other, and the first surface is a display. The docking station includes a body, and first, second, and third supporting plates disposed thereon, wherein the first, the third, and the second supporting plates are located on the body side by side sequentially. The first supporting plate is hinged to the body along a first axis, the second supporting plate is hinged to the body along a second axis, the third supporting plate is freely pivoted to the second supporting plate along the first axis, and freely pivoted to the first supporting plate along the second axis, wherein the first axis and the second axis are parallel to but not overlapped with each other. A docking station is also provided.

15 Claims, 7 Drawing Sheets

(56) References Cited

U.S. PATENT DOCUMENTS

| | | | | |
|---|---|---|---|---|
| 9,019,695 B2* | 4/2015 | Sun | ............. | G06F 1/1632 |
| | | | | 361/679.08 |
| 9,025,327 B2* | 5/2015 | Noguchi | ............. | G06F 1/1632 |
| | | | | 361/679.17 |
| 9,081,544 B2* | 7/2015 | Kim | ............. | G06F 1/1669 |
| 9,600,034 B2* | 3/2017 | Kiple | | |
| 2002/0159226 A1* | 10/2002 | Huang | ............. | G06F 1/1626 |
| | | | | 361/679.08 |
| 2002/0171020 A1* | 11/2002 | Huang | ............. | G06F 1/1632 |
| | | | | 248/346.01 |
| 2005/0073808 A1* | 4/2005 | Wang | ............. | G06F 1/1632 |
| | | | | 361/679.57 |
| 2005/0135049 A1* | 6/2005 | Huang | ............. | G06F 1/1632 |
| | | | | 361/679.09 |
| 2005/0139740 A1* | 6/2005 | Chen | ............. | F16M 11/10 |
| | | | | 248/286.1 |
| 2012/0229970 A1* | 9/2012 | Hsu | ............. | G06F 1/1626 |
| | | | | 361/679.09 |
| 2013/0015310 A1* | 1/2013 | Wu | ............. | F16M 11/10 |
| | | | | 248/346.06 |
| 2014/0139989 A1* | 5/2014 | Mori | ............. | G06F 1/1628 |
| | | | | 361/679.09 |
| 2015/0153783 A1* | 6/2015 | Corbin | ............. | A45C 13/002 |
| | | | | 361/679.09 |

FOREIGN PATENT DOCUMENTS

| | | |
|---|---|---|
| TW | 201444455 | 11/2014 |
| TW | 201444456 | 11/2014 |
| TW | I508649 | 11/2015 |

* cited by examiner

ELECTRONIC ASSEMBLY AND DOCKING STATION

CROSS-REFERENCE TO RELATED APPLICATION

This application claims the priority benefit of Taiwan application serial no. 105136569, filed on Nov. 10, 2016, and Taiwan application serial no. 105144052, filed on Dec. 30, 2016. The entirety of each of the above-mentioned patent applications is hereby incorporated by reference herein and made a part of this specification.

BACKGROUND

Technical Field

The invention relates to an electronic assembly and a docking station.

Description of Related Art

Generally speaking, a portable electronic device is characterized by being easy to carry and capable of timely sending messages and therefore is widely popular among consumers. The common portable electronic device includes a laptop, a smart phone and a tablet. The display screen of a tablet has a larger size than that of the display screen of a smart phone, and a tablet weighs lighter than a laptop. Therefore, tablets have become one of the main items for consumers in purchasing a portable electronic device.

Since the tablet has to be operated by touching a display screen and has less sufficient functionality and extensibility than the laptop, a docking station is introduced to be combined with the tablet. By installing the tablet on the docking station and enabling the state of signal transmission by a wired or wireless means, a user may operate the tablet through a keyboard set located on the docking station.

In the majority of common docking stations, a snap and an electrical connector are exposed outside a case, which easily causes damages due to collision and leads to difficulties of having a simple appearance. Meanwhile, the tablet can only be installed to the docking station in a single direction, so there is a considerable degree of inconvenience in operation.

SUMMARY

The disclosure provides a docking station and an electronic assembly having a supporting plate that is capable of two-way flips to render the portable electronic device to be supported on the docking station in a different dimension.

An electronic assembly according to an embodiment of the disclosure includes a portable electronic device and a docking station. The electronic device has a first surface and a second surface opposite to each other, and the first surface is a display. The docking station includes a body, a first supporting plate, a second supporting plate, and a third supporting plate. The first supporting plate, the third supporting plate, and the second supporting plate are disposed on the body side by side sequentially. The first supporting plate is hinged to the body about a first axis, the second supporting plate is hinged to the body about a second axis, the third supporting plate is freely pivoted to the second supporting plate along the first axis, and the third supporting plate is freely pivoted to the first supporting plate along the second axis. The first axis and the second axis are parallel to but not overlapped with each other.

A docking station according to an embodiment of the disclosure is configured for supporting a portable electronic device. The docking station includes a body, a first supporting plate, a second supporting plate, and a third supporting plate. The first supporting plate has a first edge and a second edge opposite to each other. The first edge is hinged to the body such that the first supporting plate rotates relative to the body and opens and closes. The second supporting plate has a third edge and a fourth edge opposite to each other. The third edge is hinged to the body such that the second supporting plate rotates relative to the body and opens and closes. The third supporting plate has a fifth edge and a sixth edge opposite to each other. The fifth edge is freely pivoted to the fourth edge, and the sixth edge is freely pivoted to the second edge. When the first supporting plate is unfolded relative to the body, the third supporting plate is unfolded relative to the body following the first supporting plate to form a first state such that the portable electronic device is supported by the first supporting plate and the third supporting plate to stand on the docking station. When the second supporting plate is unfolded relative to the body, the third supporting plate is unfolded relative to the body following the second supporting plate to form a second state such that the portable electronic device is supported by the second supporting plate and the third supporting plate to stand on the docking station.

In view of the above, the docking station according to the embodiments of the invention has the first supporting plate, the second supporting plate and the third supporting plate disposed on the body. Meanwhile, different sides (axes) of the first supporting plate and the second supporting plate are hinged to the body of the docking station respectively, and other different sides (axes) of the first supporting plate and the second supporting plate are freely pivoted to the third supporting plate. It is noteworthy that the different sides (axes) are respectively coaxial with the part where the first supporting plate is hinged to the body and the part where the second supporting plate is hinged to the body respectively. In doing so, when the first supporting plate and the second supporting plate rotate relative to the body individually, the first supporting plate and the second supporting plate are able to drive the third supporting plate to rotate. Consequently, the third supporting plate may turn relative to the body in different axial directions, thereby enabling two-way flips. Accordingly, the portable electronic device can stand on the docking station in different states to be applicable for different operational modes.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
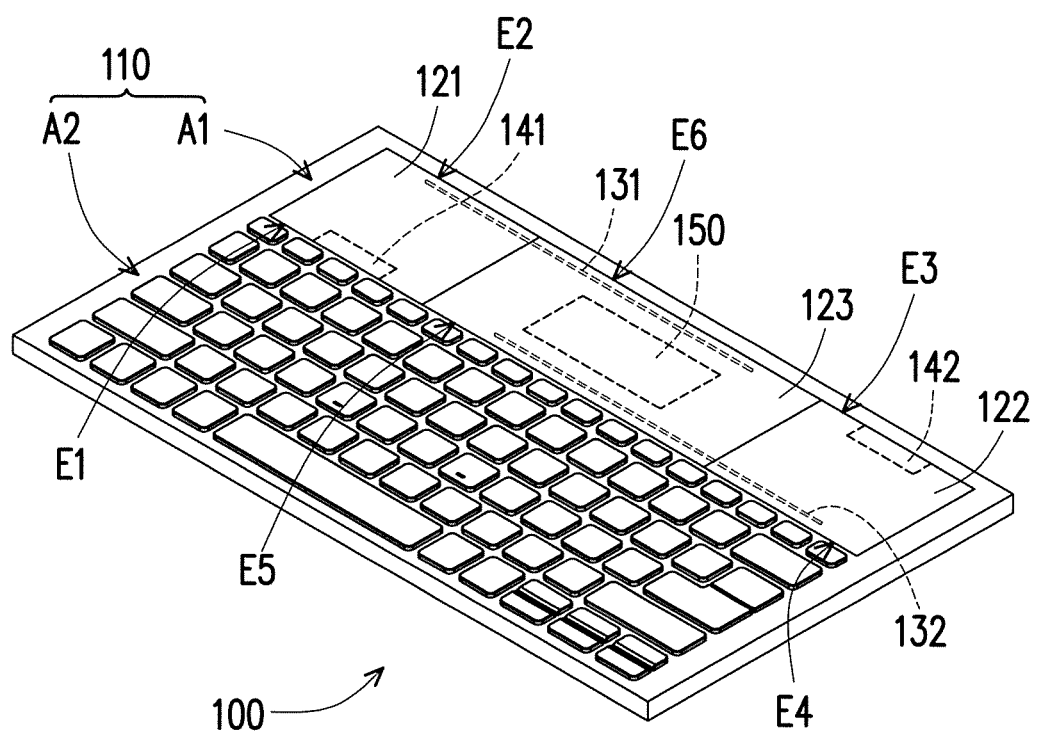
FIG. 1 is a schematic view illustrating a docking station according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

Figure 2:
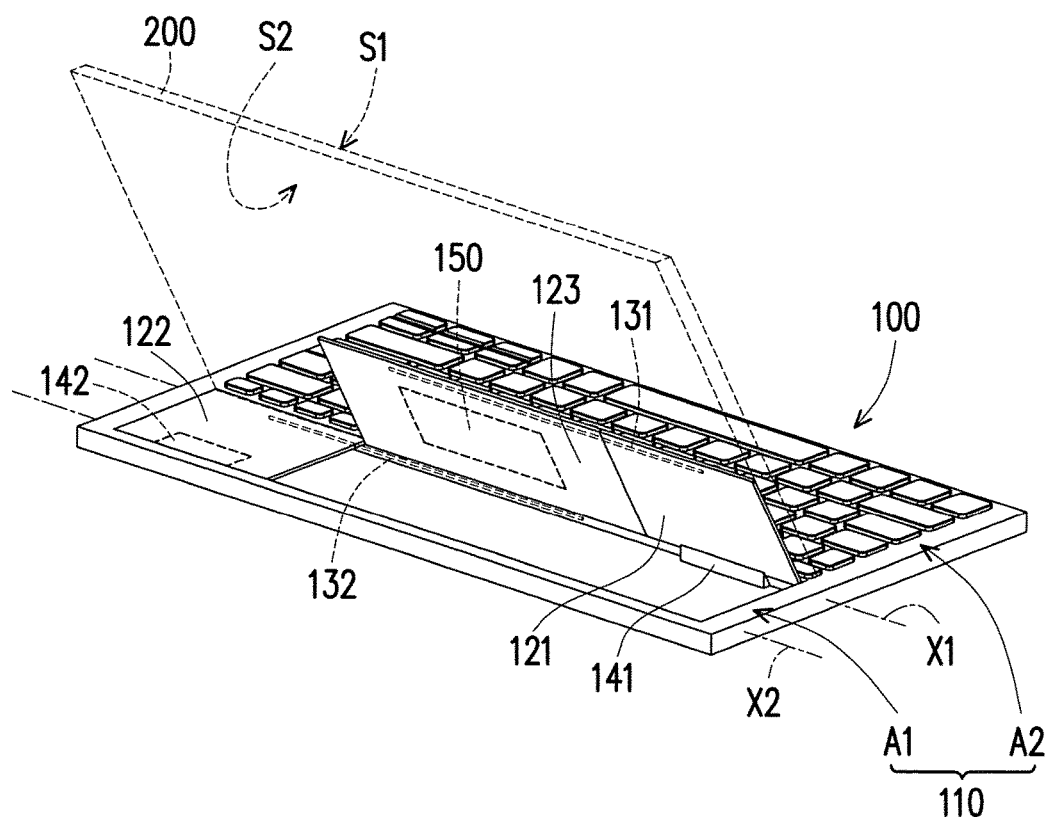
FIG. 2 and FIG. 3 are schematic views respectively illustrating an electronic assembly in another state according to an embodiment of the disclosure.
Figure 3:
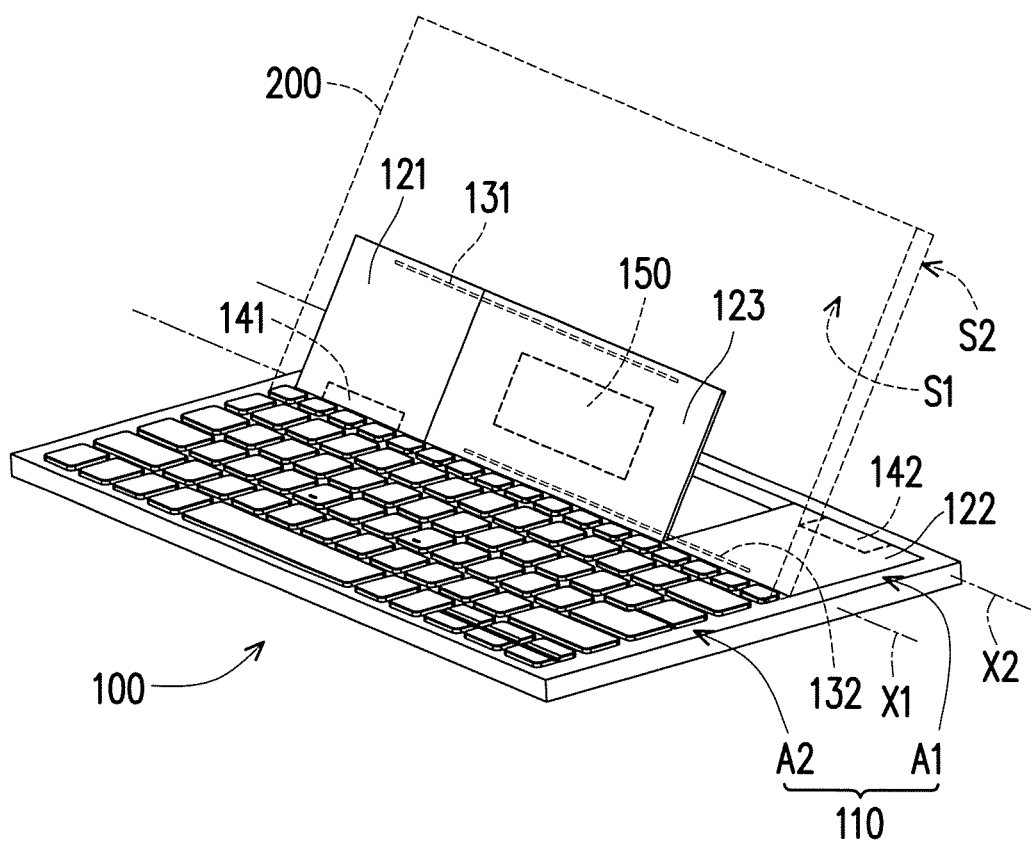

FIG. 1 illustrates a schematic view of a docking station according to an embodiment of the invention. FIG. 2 and FIG. 3 are schematic views respectively illustrating an electronic assembly in another state according to an embodiment of the invention. An electronic assembly 10 is used for switching a docking station 100 in different states to render a portable electronic device 200 to be supported by the docking station 100 in different poses. Referring to FIGS. 1 to 3 at the same time, in the embodiment, the electronic assembly 10 includes the portable electronic device 200 and the docking station 100. Here, the portable electronic device 200 is a tablet, for example. The portable electronic device 200 has a first surface S1 and a second surface S2 opposite to each other, and the first surface S1 is a display of the tablet. The docking station 100 includes a body 110, a first supporting plate 121, a second supporting plate 122 and a third supporting plate 123. In addition, the body 110 is divided into a first region A1 and a second region A2, the first supporting plate 121, the third supporting plate 123 and the second supporting plate 122 are disposed in the first region A1 of the body 110 side by side sequentially, and an input interface of the docking station 100 such as a keyboard is disposed in the second region A2.

In the embodiment, the first supporting plate 121 is hinged to the body 110 along a first axis X1, the second supporting plate 122 is hinged to the body 110 along a second axis X2, the third supporting plate 123 is freely pivoted to the second supporting plate 122 along the first axis X1 and is freely pivoted to the first supporting plate 121 along the second axis X2. The first axis X1 and the second axis X2 are parallel to but not overlapped with each other. In the embodiment, the first axis X1 and the second axis X2 are kept away from each other in a fixed distance on opposite sides of the supporting plates 121-123 respectively.

Furthermore, a hinge 141 is connected between the first supporting plate 121 and the body 110 to render the first supporting plate 121 to rotate relative to the body 110 about the first axis X1. A hinge 142 is connected between the second supporting plate 122 and the body 110 to render the second supporting plate 122 to rotate relative to the body 110 about the second axis X2. Meanwhile, the first supporting plate 121 and the third supporting plate 123 are freely pivoted to each other through a shaft 131, and the second supporting plate 122 and the third supporting plate 123 are freely pivoted to each other through a shaft 132.

Being freely pivoted means that the connected members are freely rotatable through a shaft without torsion, and is different from the effect of being hinged (with torsion) generated by the hinge (141 or 142). Furthermore, the shafts 131 and 132 are parallel to the first axis X1 and the second axis X2. In the state of being paved as shown in FIG. 1, the shaft 131 is substantially viewed as consistent with the second axis X2, and the shaft 132 is substantially viewed as consistent with the first axis X1.

Accordingly, with the combination of the members, the docking station 100 may be transformed in different states through the first supporting plate 121, the second supporting plate 122 and the third supporting plate 123. As in a first state as illustrated in FIGS. 2 and 3, the first supporting plate 121 and the third supporting plate 123 stand on the body 110. Therefore, the portable electronic device 200 may be supported on the first supporting plate 121 and the third supporting plate 123 with the second surface S2 of the portable electronic device 200 to render the first surface S1 to face toward the second region A2 of the body 110 and faces the same side where the input interface faces the body 110 so that the electronic assembly 10 may simulate an operational mode of a laptop.

Speaking in detail, the third supporting plate 123 of the embodiment has a magnetic region 150. The magnetic region 150 may be formed by disposing a magnet in the third supporting plate 123. However, the means of forming the magnetic region 150 and the range of the magnetic region 150 should not be limited thereto. The second surface S2 of the portable electronic device 200 may be magnetically conductive because of the properties of the structure and material of the second surface. Consequently, in the state of being paved as shown in FIG. 1, when the portable electronic device 200 approaches the third supporting plate 123 with the second surface S2, the portable electronic device 200 magnetically attracts the third supporting plate 123 to lift the third supporting plate 123 from the state of being paved as shown in FIG. 1. At the moment, when a user turns the portable electronic device 200 toward the second region A2 of the body 110, that is, the portable electronic device 200 rotates about the first axis X1, the supporting plate 122 is freely pivoted to the third supporting plate 123 with the shaft 132 (equivalent to the case that the third supporting plate 123 rotates through the shaft 132), so the second supporting plate 122 does not rotate with the third supporting plate 123. By contrast, the first supporting plate 121 is freely pivoted to the third supporting plate 123 through the shaft 131, so the first supporting plate 121 follows the third supporting plate 123 to be lifted off from the body 110 synchronously, so as to come to a state where the third supporting plate 123 and the first supporting plate 121 stand on the body 110, and the second supporting plate 122 is paved on the body 110.

Figure 4:
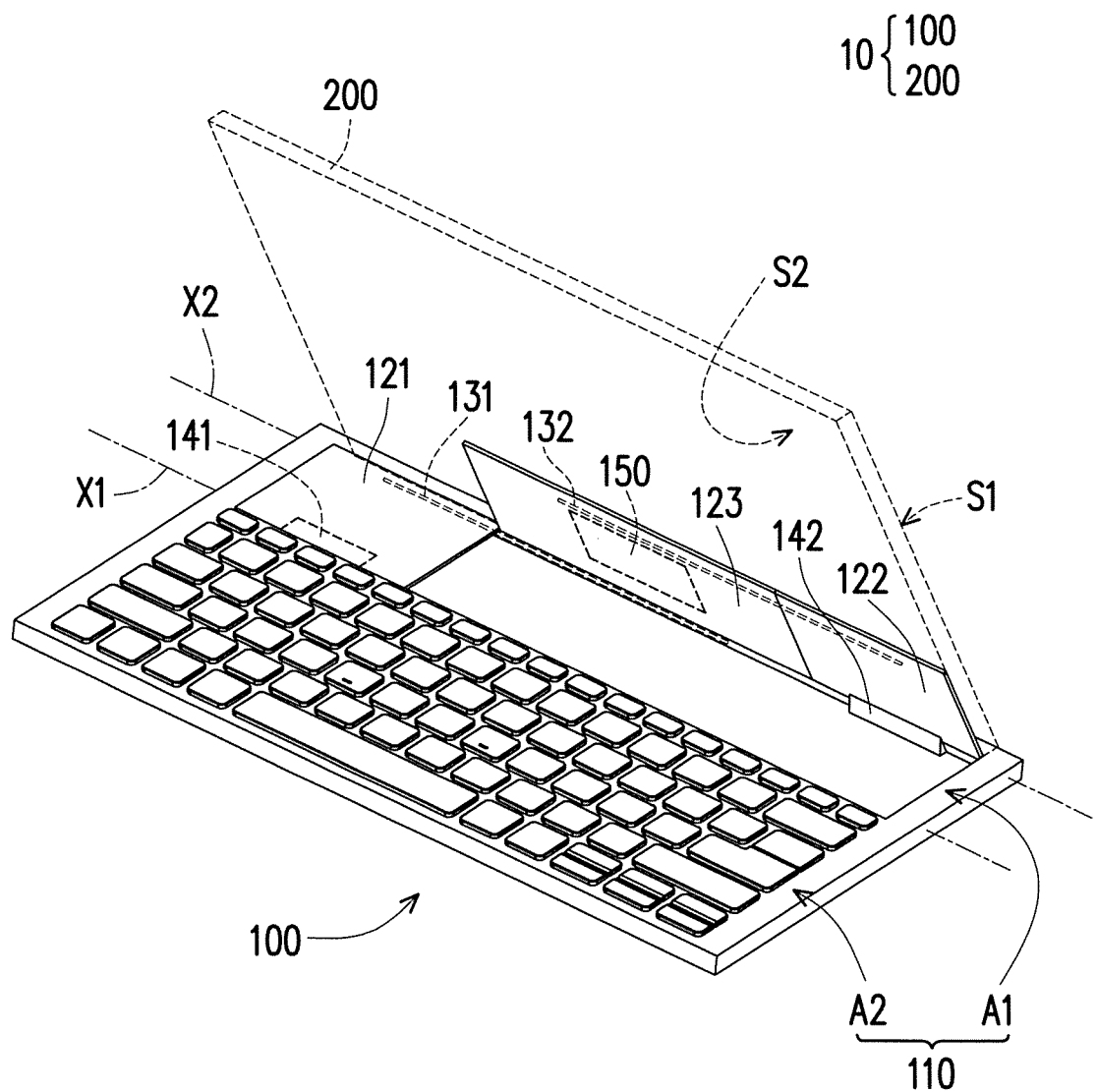
FIG. 4 is a schematic view illustrating the electronic assembly of FIG. 2 in yet another state.

FIG. 4 is a schematic view illustrating the electronic assembly of FIG. 2 in yet another state. Similar to what is mentioned previously, in the state of being paved as shown in FIG. 1, the portable electronic device 200 may be configured to approach the third supporting plate 123 with the second axis X2. That is, the third supporting plate 123 is turned with the shaft 131 to lead to a different effect from those effects as mentioned (in FIGS. 2 and 3), namely a second state where the second supporting plate 122 is configured to stand on the body 110 following the third supporting plate 123, but the first supporting plate 121 remains paved on the body 110. At the moment, the portable electronic device 200 remains to be supported on the second supporting plate 122, the third supporting plate 123 and the body 110 with the second surface S2 to render the first surface S1 to face away from the input interface to simulate a viewing mode using the portable electronic device 200.

Referring to FIG. 1 again, as far as merely the docking station 100 of the embodiment is concerned, the first supporting plate 121, the second supporting plate 122 and the third supporting plate 123 are disposed in the first region A1 of the body 110, but not overlapped with each other. The first supporting plate 121 has a first edge E1 and a second edge E2 opposite to each other, the first edge E1 being hinged to the body 110 through the hinge 141. The second supporting plate 122 has a third edge E3 and a fourth edge E4 opposite to each other, the third edge E3 being hinged to the body 110 through the hinge 142. The third supporting plate 123 has a fifth edge E5 and a sixth edge E6 opposite to each other, the fifth edge E5 being coaxially pivoted to the fourth edge E4, and the sixth edge E6 being coaxially pivoted to the second edge E2. It is worth mentioning that in the state of being paved as illustrated in FIG. 1, the first edge E1, the fifth edge E5 and the fourth edge E4 are substantially on a same line and consistent with the first axis X1, and the second edge E2, the third edge E3 and the sixth edge E6 are substantially on another same line and consistent with the second axis X2.

Figure 5:
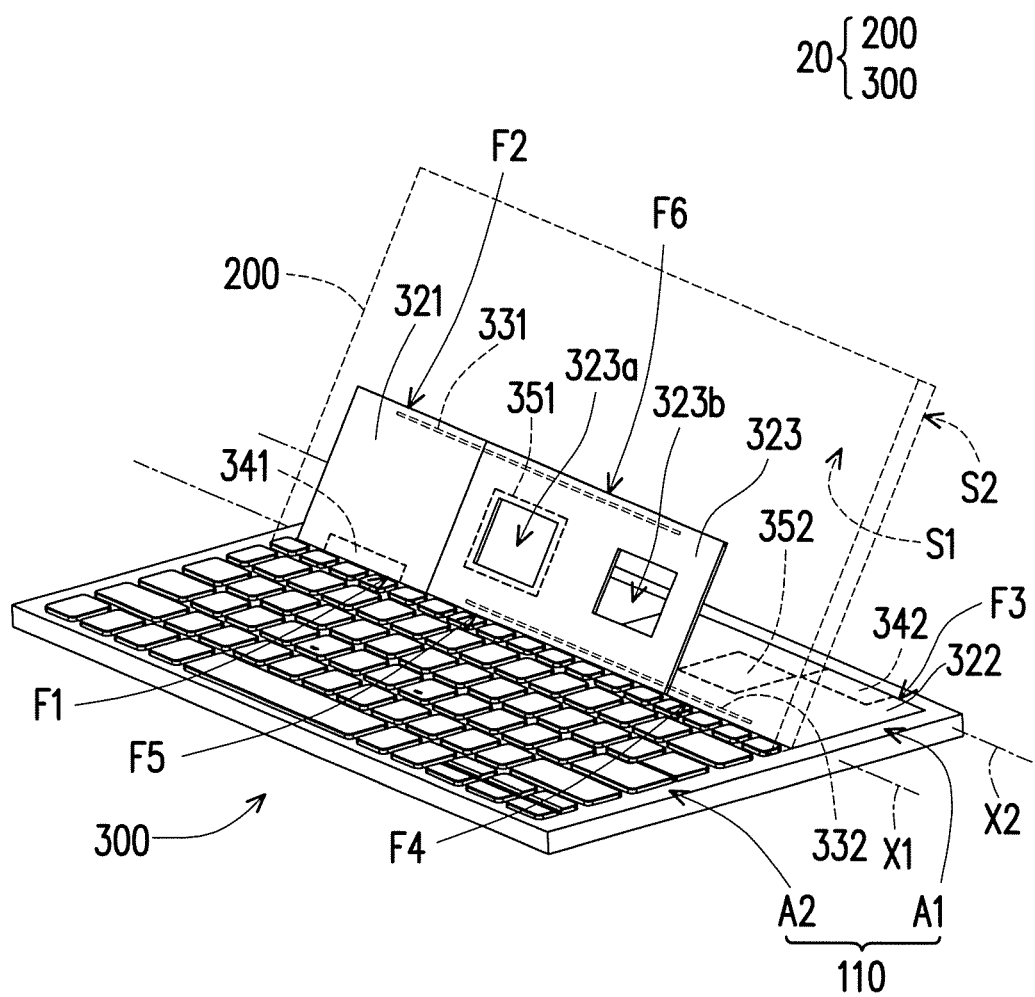
FIG. 5 and FIG. 6 are schematic views respectively illustrating an electronic device according to another embodiment of the disclosure in different perspectives.
Figure 6:
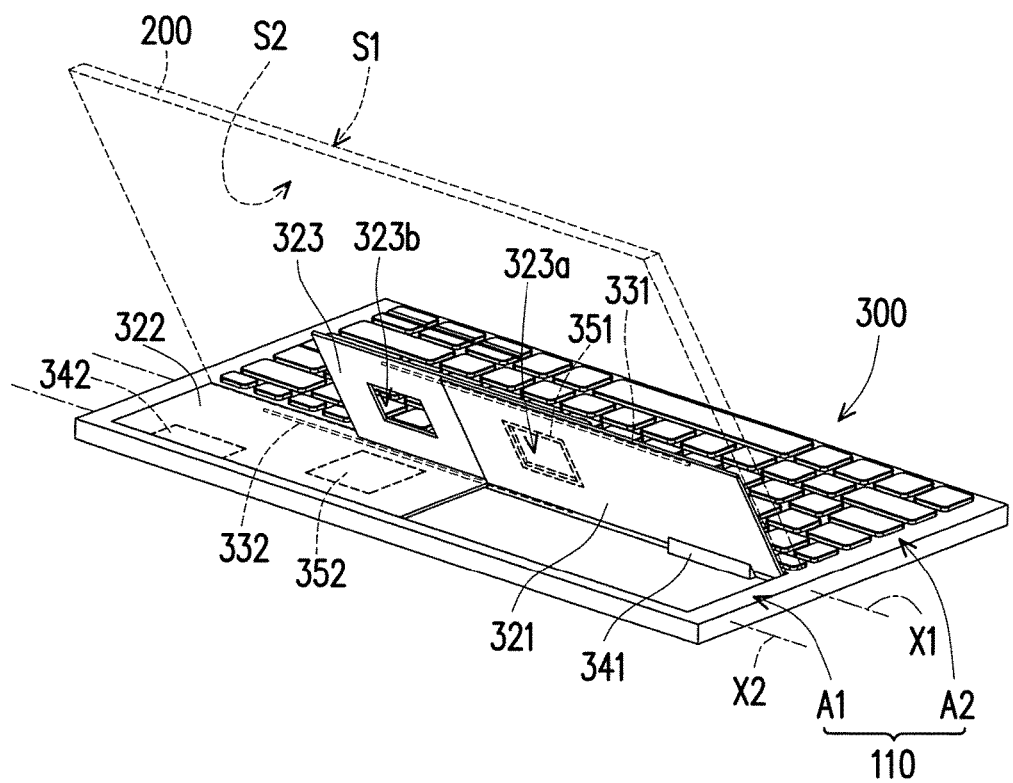

FIGS. 5 and 6 are schematic views respectively illustrating an electronic assembly of another embodiment in different perspectives. Referring to FIGS. 5 and 6 at the same time, in the embodiment, an electronic assembly 20 also includes the portable electronic device 200 and a docking station 300. The difference from what is mentioned previously is that the first region A1 of the body 110 of the docking station 300 is occupied in full by a first supporting plate 321 and a second supporting plate 322, and a third supporting plate 323 is overlapped with the first supporting plate 321 and the second supporting plate 322. In other words, the third supporting plate 323 is overlapped with the first supporting plate 321 and the second supporting plate 322 respectively in different blocks, and the first supporting plate 321 and the second supporting plate 322 are not overlapped with each other.

Furthermore, the third supporting plate 323 has a first opening 323a and a second opening 323b, and the first supporting plate 321 has a first magnetic region 351, and the second supporting plate 322 has a second magnetic region 352. In addition, the first magnetic region 351 and the first opening 323a correspond to each other, and the second magnetic region 352 and the second opening 323b correspond to each other.

In addition, what is similar to the previous embodiment is that the first supporting plate 321 is hinged to the first region A1 of the body 110 through a hinge 341, and the second supporting plate 322 is hinged to the first region A1 of the body through a hinge 342. Also, the first supporting plate 321 and the third supporting plate 323 are freely pivoted to each other through a shaft 331, and the second supporting plate 322 and the third supporting plate 323 are freely pivoted to each other through a shaft 332. The arrangement of the above members and the mutual relation among the members, the first axis X1 and the second axis X2 are the same as those of the previous embodiment. Therefore, details in this regard are not repeated here.

The embodiment merely illustrates an example equivalent to the first state. At the moment, the first opening 323a is located within an overlapping range of the third supporting plate 323 and the first supporting plate 321, and the first magnetic region 351 is correspondingly magnetically attracted to the second surface S2 of the portable electronic device 200 through the first opening 323a. In other words, when the docking station 300 of the embodiment is in the state of being paved as shown in FIG. 1, and, a user uses the second surface S2 of the portable electronic device 200 to approach the third supporting plate 323, the first magnetic region 351 of the first supporting plate 321 is exposed through the first opening 323a and therefore magnetically attracted to the second surface S2 of the portable electronic device 200. In this way, the third supporting plate 323 may be sandwiched between the first supporting plate 321 and the second surface S2 of the portable electronic device 200 so that the three members are able to be moved together and turned into the first state as shown in FIGS. 5 and 6.

Similarly, in the second state, the second opening 323b is located within the overlapping range of the third supporting plate 323 and the second supporting plate 322. Moreover, the second magnetic region 352 is correspondingly magnetically attracted to the second surface S2 of the portable electronic device 200 through the second opening 323b. Although the situation is not illustrated here, the descriptions about the arrangement and operation of the members already provide sufficient teaching in this regard. On the other hand, in the embodiment, the first supporting plate 321 has a first edge F1 and a second edge F2 opposite to each other, the second supporting plate 322 has a third edge F3 and a fourth edge F4 opposite to each other, and the third supporting plate 323 has a fifth edge F5 and a sixth edge F6 opposite to each other. In addition, in the embodiment, in the state of being paved in FIG. 1, the first edge F1 and the fourth edge F4 are in a line, and the fifth edge F5 is located above the line, whereas the second edge F2 and the third edge F3 are in another line, and the sixth edge F6 is located above the another line.

Figure 7:
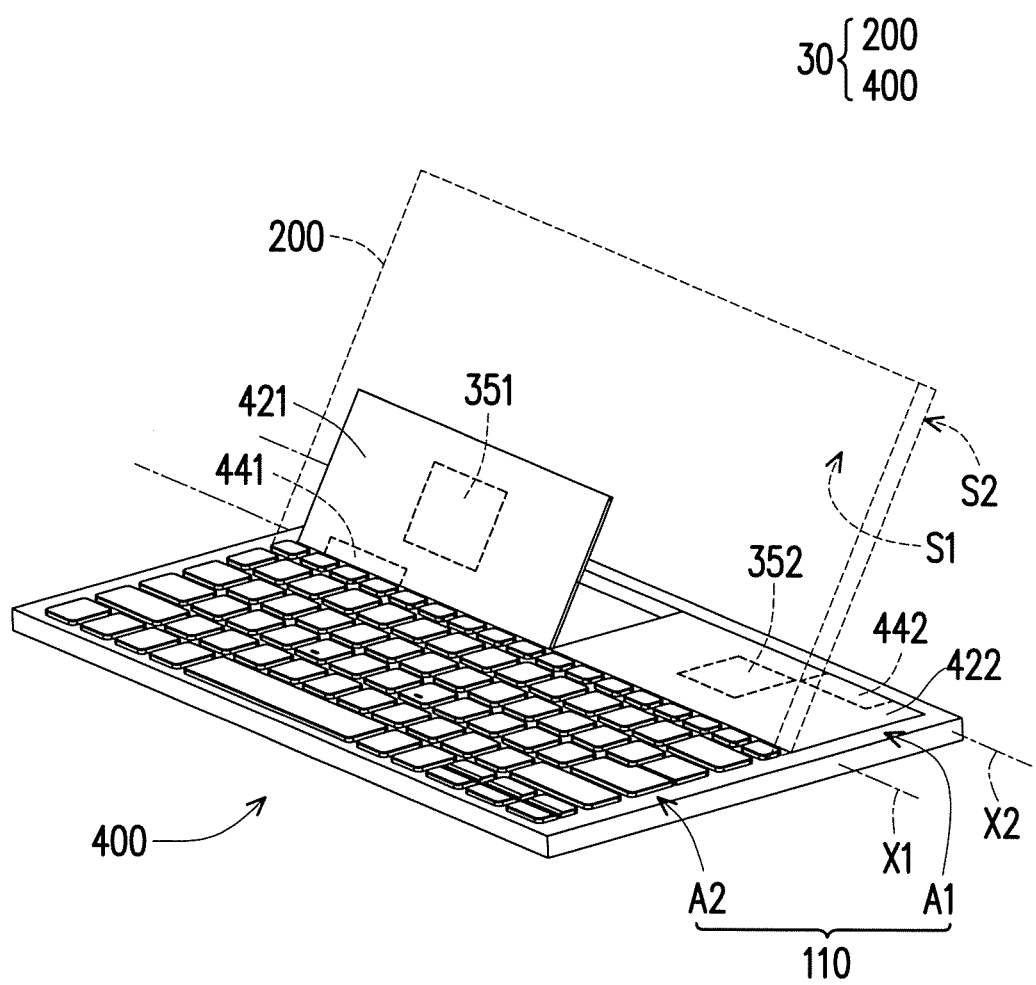
FIG. 7 is a schematic view illustrating an electronic assembly according to another embodiment of the disclosure.

FIG. 7 is a schematic view illustrating an electronic assembly according to another embodiment of the invention. An electronic assembly 30 of the embodiment includes the portable electronic device 200 and a docking station 400. What is different from the previous embodiment is that only a first supporting plate 421 and a second supporting plate 422 are disposed on the body 110 of the docking station 400, the first supporting plate 421 is hinged to the first region A1 of the body 110 through a hinge 441, the second supporting plate 422 is hinged to the first region A1 of the body 110 through a hinge 442, and the first supporting plate 421 and the second supporting plate 422 substantially occupy the first region A1 in full when in the state of being paved.

In addition, what is similar to the previous embodiment is that the first supporting plate 421 has the first magnetic region 351, the second supporting plate 422 has the second magnetic region 352, and the mutual relation among the aforementioned members, the first axis X1 and the second axis X2 is also the same case as the previous embodiment. Therefore, details in this regard are not repeated here.

Accordingly, the portable electronic device 200 is able to lift the first supporting plate 421 or the second supporting plate 422 off the body respectively through magnetic attraction with respect to the first supporting plate 421 or the second supporting plate 422 to achieve the state of being supported by the body 110 and the first supporting plate 421 or being supported by the body 110 and the second supporting plate 422.

In view of the foregoing, in the embodiments of the invention, the docking station has the first supporting plate, the second supporting plate and the third supporting plate disposed on the body. Meanwhile, different sides (axes) of the first and the second supporting plates are hinged to the body of the docking station respectively, and other different sides (axes) of the first and the second supporting plates are freely pivoted to the third supporting plate. It is noteworthy that the different sides (axes) are respectively coaxial with the part where the first supporting plate is hinged to the body and the part where the second supporting plate is hinged to the body.

In so doing, when the first supporting plate and the second supporting plate rotate relative to the body individually, the first supporting plate and the second supporting plate are able to drive the third supporting plate to rotate. Therefore, the third supporting plate may turn relative to the body in different axial directions, thereby enabling two-way flips. In this way, the portable electronic device can stand on the docking station in different states, so as to be applicable for different operational modes.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic assembly, comprising:
a portable electronic device having a first surface and a second surface opposite to each other, wherein the first surface is a display of the portable electronic device;
a docking station, comprising:
a body; and
a first supporting plate, a third supporting plate and a second supporting plate, disposed on the body side by side sequentially, wherein the first supporting plate is hinged to the body along a first axis, the second supporting plate is hinged to the body along a second axis, the third supporting plate is freely pivoted to the second supporting plate along the first axis, and the third supporting plate is freely pivoted to the first supporting plate along the second axis, the first axis and the second axis being parallel to but not overlapped with each other, such that when in a first state, the first supporting plate and the third supporting plate stand on the body, and the second surface of the portable electronic device is supported on the first supporting plate and the third supporting plate, and when in a second state, the third supporting plate and the second supporting plate stand on the body, and the second surface of the portable electronic device is supported on the third supporting plate and the second supporting plate.

2. The electronic assembly according to claim 1, wherein in the first state, the second supporting plate is paved on the body, and in the second state, the first supporting plate is paved on the body.

3. The electronic assembly according to claim 1, wherein the body has a first region and a second region different from each other, and the body further has an input interface located at the second region, wherein the first supporting plate, the second supporting plate and the third supporting plate are located in the first region, and the first surface faces toward the first region when the docking station is in the first state, and the first surface faces away from the first region when the docking station is in the second state.

4. The electronic assembly according to claim 1, wherein at least a part of the third supporting plate is magnetic or magnetically conductive, and the second surface of the portable electronic device is magnetically conductive or magnetic, such that the portable electronic device drives the third supporting plate to move relative to the body through magnetic attraction.

5. The electronic assembly according to claim 1, wherein the first supporting plate, the second supporting plate and the third supporting plate are disposed on the body, but not overlapped with each other.

6. The electronic assembly according to claim 1, wherein different blocks of the third supporting plate are respectively overlapped with the first supporting plate and the second supporting plate, and the first supporting plate and the second supporting plate are not overlapped with each other.

7. The electronic assembly according to claim 6, wherein the third supporting plate has a first opening and a second opening, the first supporting plate has a first magnetic region, the second supporting plate has a second magnetic region, wherein the first opening is located within an overlapping range of the third supporting plate and the first supporting plate, and the first magnetic region is correspondingly magnetically attracted to the second surface of the portable electronic device through the first opening when in the first state, wherein the second opening is located within an overlapping range of the third supporting plate and the second supporting plate, and the second magnetic region is correspondingly magnetically attracted to the second surface of the portable electronic device through the second opening when in the second state.

8. A docking station, configured for supporting a portable electronic device, the docking station comprising:
a body;
a first supporting plate having a first edge and a second edge opposite to each other, wherein the first edge is hinged to the body, such that the first supporting plate rotates relative to the body to be unfolded or folded;
a second supporting plate having a third edge and a fourth edge opposite to each other, wherein the third edge is hinged to the body, such that the second supporting plate rotates relative to the body to be unfolded or folded; and
a third supporting plate having a fifth edge and a sixth edge opposite to each other, the fifth edge being freely pivoted to the fourth edge, and the sixth edge being freely pivoted to the second edge, wherein when the first supporting plate is unfolded relative to the body, the third supporting plate is unfolded relative to the body following the first supporting plate to be in a first state, such that the portable electronic device is supported by the first supporting plate and the third supporting plate and stands on the docking station, wherein when the second supporting plate is unfolded relative to the body, the third supporting plate is unfolded relative to the body following the second supporting plate to be in a second state, such that the portable electronic device is supported by the second supporting plate and the third supporting plate and stands on the docking station.

9. The docking station according to claim 8, wherein the fourth edge is coaxially pivoted to the fifth edge, and the second edge is coaxially pivoted to the sixth edge.

10. The docking station according to claim 8, wherein in the first state, the second supporting plate is paved on the body, and in the second state, the first supporting plate is paved on the body.

11. The docking station according to claim 8, wherein at least a part of the third supporting plate is magnetic or magnetically conductive, and the portable electronic device is magnetically conductive or magnetic, such that the portable electronic device drives the third supporting plate to move relative to the body through magnetic attraction.

12. The docking station according to claim 8, wherein the first supporting plate, the second supporting plate and the third supporting plate are disposed on the body, but not overlapped with each other.

13. The docking station according to claim 8, wherein different blocks of the third supporting plate are respectively overlapped with the first supporting plate and the second supporting plate, and the first supporting plate and the second supporting plate are not overlapped with each other.

14. The docking station according to claim 13, wherein the third supporting plate has a first opening and a second opening, the first supporting plate has a first magnetic region, the second supporting plate has a second magnetic region, wherein the first opening is located within an overlapping range of the third supporting plate and the first supporting plate, and the first magnetic region is correspondingly magnetically attracted to the second surface of the portable electronic device through the first opening when in the first state, wherein the second opening is located within an overlapping range of the third supporting plate and the second supporting plate, and the second magnetic region is correspondingly magnetically attracted to the second surface of the portable electronic device through the second opening when in the second state.

15. The docking station according to claim 8, wherein the body has a first region and a second region different from each other, and the body further has an input interface located on the second region, wherein the first supporting plate, the second supporting plate, and the third supporting plate are located in the first region, when the portable electronic device is supported by the first supporting plate and the third supporting plate or the portable electronic device is supported on the second supporting plate and the third supporting plate, the portable electronic device is located between the first region and the second region, and different surfaces of the portable electronic device face toward the first region and the second region respectively.

* * * * *